United States Patent
Derelöv (10) Patent No.: US 9,714,672 B2
(45) Date of Patent: Jul. 25, 2017

(54) PANELS COMPRISING A MECHANICAL LOCKING DEVICE AND AN ASSEMBLED PRODUCT COMPRISING THE PANELS

(71) Applicant: Valinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 151 days.

(21) Appl. No.: 14/573,473

(22) Filed: Dec. 17, 2014

(65) Prior Publication Data

US 2015/0196118 A1   Jul. 16, 2015

Related U.S. Application Data

(63) Continuation-in-part of application No. 14/158,165, filed on Jan. 17, 2014.

(30) Foreign Application Priority Data

Jan. 10, 2014  (SE) ...................... 1450022

(51) Int. Cl.
  *F16B 5/06* (2006.01)
  *A47B 47/04* (2006.01)
  (Continued)

(52) U.S. Cl.
  CPC .......... *F16B 5/0614* (2013.01); *A47B 47/042* (2013.01); *F16B 12/125* (2013.01);
  (Continued)

(58) Field of Classification Search
  CPC ...... F16B 5/008; F16B 5/0012; F16B 5/0016; F16B 5/0024; F16B 12/12; F16B 12/125;
  (Continued)

(56) References Cited

U.S. PATENT DOCUMENTS 291,032 A   1/1884   Cleland
634,581 A   10/1899  Miller
(Continued)

FOREIGN PATENT DOCUMENTS

CN        203424576 U      2/2014
DE   20 2009 008 825 U1   10/2009
(Continued)

OTHER PUBLICATIONS

U.S. Appl. No. 14/794,893, Derelöv, et al.
(Continued)

*Primary Examiner* — Jonathan Masinick
(74) *Attorney, Agent, or Firm* — Buchanan Ingersoll & Rooney P.C.

(57) ABSTRACT

A set of panels includes a first panel having a first main plane and a second panel having a second main plane. The panels are provided with a mechanical locking device for locking a first edge of the first panel to a second edge of the second panel. The mechanical locking device includes an edge section groove at the first edge, wherein an edge section of the second edge is insertable into the edge section groove. A flexible tongue is arranged in an insertion groove provided in the edge section groove, and cooperates with a tongue groove provided at the edge section of the second panel. A first thickness of a core material between the edge section groove and the outermost surface of the first edge is greater than a minimum second thickness of a core material of the edge section of the second panel.

13 Claims, 7 Drawing Sheets

(51) Int. Cl.
   *F16B 12/12* (2006.01)
   *F16B 12/46* (2006.01)

(52) U.S. Cl.
   CPC ........ *F16B 12/46* (2013.01); *F16B 2012/466* (2013.01); *Y10T 403/1674* (2015.01); *Y10T 403/7075* (2015.01)

(58) Field of Classification Search
   CPC ............... F16B 12/26; E04F 15/02038; E04F 15/020056; E04F 15/02077; E04F 2201/0138; E04F 2201/0146; E04F 2201/0523; E04F 2201/0505; E04F 2201/0107; E04F 2201/0115; A47B 47/0066; A47B 47/0091
   See application file for complete search history.

(56) References Cited

U.S. PATENT DOCUMENTS

| | | | |
|---|---|---|---|
| 701,000 | A | 5/1902 | Ahrens |
| 861,911 | A | 7/1907 | Stewart |
| 881,673 | A | 3/1908 | Ellison |
| 1,534,468 | A | 4/1925 | Shea, Jr. |
| 1,954,242 | A | 4/1934 | Heppenstall |
| 2,360,451 | A | 10/1944 | Stone |
| 2,362,904 | A | 11/1944 | Kramer |
| 2,496,184 | A | 1/1950 | Von Canon |
| 3,195,968 | A | 7/1965 | Freeman |
| 3,284,152 | A | 11/1966 | Schörghuber |
| 3,347,610 | A | 10/1967 | Pilliod |
| 3,410,441 | A | 11/1968 | Rhyne |
| 3,722,704 | A | 3/1973 | Piretti |
| 3,784,271 | A | 1/1974 | Schreiber |
| 3,885,845 | A | 5/1975 | Krieks |
| 4,089,614 | A | 5/1978 | Harley |
| 4,099,887 | A | 7/1978 | Mackenroth |
| 4,116,510 | A | 9/1978 | Franco |
| 4,279,397 | A | 7/1981 | Larsson |
| 4,509,648 | A | 4/1985 | Govang |
| 4,597,122 | A | 7/1986 | Handler et al. |
| 4,750,794 | A | 6/1988 | Vegh |
| 4,752,150 | A | 6/1988 | Salice |
| 4,883,331 | A | 11/1989 | Mengel |
| 4,886,326 | A | 12/1989 | Kuzyk |
| 4,909,581 | A | 3/1990 | Haheeb |
| 5,114,265 | A | 5/1992 | Grisley |
| 5,209,556 | A | 5/1993 | Anderson |
| 5,475,960 | A | 12/1995 | Lindal |
| 5,499,886 | A | 3/1996 | Short et al. |
| 5,527,103 | A | 6/1996 | Pittman |
| 5,658,086 | A | 8/1997 | Brokaw et al. |
| 5,893,617 | A | 4/1999 | Lee |
| 5,950,389 | A | 9/1999 | Porter |
| 6,413,007 | B1 | 7/2002 | Lambright |
| 6,675,979 | B2 | 1/2004 | Taylor |
| 6,769,219 | B2 | 8/2004 | Schwitte |
| 6,827,028 | B1 | 12/2004 | Callaway |
| 7,451,535 | B2 | 11/2008 | Wells et al. |
| 7,584,583 | B2 | 9/2009 | Bergelin et al. |
| 7,621,092 | B2 | 11/2009 | Groeke et al. |
| 7,641,414 | B1 | 1/2010 | Joyce |
| 7,721,503 | B2 | 5/2010 | Pervan et al. |
| 7,818,939 | B2 | 10/2010 | Bearinger |
| 7,998,549 | B2 | 8/2011 | Susnjara |
| 8,042,311 | B2 | 10/2011 | Pervan |
| 8,220,217 | B2 | 7/2012 | Muehlebach |
| 8,387,327 | B2 | 3/2013 | Pervan |
| 8,505,257 | B2 | 8/2013 | Boo et al. |
| 8,615,952 | B2 | 12/2013 | Engström |
| 8,764,137 | B2 | 7/2014 | Fehre |
| 8,887,468 | B2 | 11/2014 | Håkansson et al. |
| 9,175,703 | B2 | 11/2015 | Maertens |
| 9,290,948 | B2 | 3/2016 | Cappelle et al. |
| 9,375,085 | B2 | 6/2016 | Derelöv |
| 9,538,842 | B2 | 1/2017 | Håkansson et al. |
| 2002/0170258 | A1 | 11/2002 | Schwitte |
| 2006/0101769 | A1 | 5/2006 | Pervan et al. |
| 2006/0273085 | A1 | 12/2006 | Casto |
| 2007/0006543 | A1 | 1/2007 | Engström |
| 2008/0236088 | A1 | 10/2008 | Hannig et al. |
| 2010/0083603 | A1 | 4/2010 | Goodwin |
| 2010/0173122 | A1 | 7/2010 | Susnjara |
| 2010/0289389 | A1 | 11/2010 | Crabtree, II |
| 2011/0225921 | A1 | 9/2011 | Schulte |
| 2011/0225922 | A1 | 9/2011 | Pervan et al. |
| 2011/0280655 | A1 | 11/2011 | Maertens et al. |
| 2011/0283650 | A1 | 11/2011 | Pervan et al. |
| 2012/0027967 | A1 | 2/2012 | Maertens et al. |
| 2012/0073235 | A1 | 3/2012 | Hannig |
| 2012/0124932 | A1 | 5/2012 | Schulte et al. |
| 2012/0279161 | A1 | 11/2012 | Håkansson et al. |
| 2012/0286637 | A1 | 11/2012 | Fehre |
| 2013/0014463 | A1 | 1/2013 | Pervan |
| 2013/0048632 | A1 | 2/2013 | Chen |
| 2013/0071172 | A1 | 3/2013 | Maertens et al. |
| 2013/0081349 | A1 | 4/2013 | Pervan |
| 2013/0111845 | A1 | 5/2013 | Pervan |
| 2013/0170904 | A1 | 7/2013 | Cappelle et al. |
| 2013/0232905 | A2 | 9/2013 | Pervan |
| 2014/0055018 | A1 | 2/2014 | Shein et al. |
| 2014/0286701 | A1 | 9/2014 | Sauer |
| 2015/0035422 | A1 | 2/2015 | Håkansson et al. |
| 2015/0078807 | A1 | 3/2015 | Brännström et al. |
| 2015/0078819 | A1 | 3/2015 | Derelöv et al. |
| 2015/0198191 | A1 | 7/2015 | Boo |
| 2015/0230600 | A1 | 8/2015 | Schulte |
| 2015/0368896 | A1 | 12/2015 | Schulte |
| 2016/0000220 | A1 | 1/2016 | Devos |
| 2016/0007751 | A1 | 1/2016 | Derelöv et al. |
| 2016/0145029 | A1 | 5/2016 | Ranade et al. |
| 2016/0174704 | A1 | 6/2016 | Boo et al. |
| 2016/0192775 | A1 | 7/2016 | Andersson |
| 2016/0270531 | A1 | 9/2016 | Derelöv |

FOREIGN PATENT DOCUMENTS

| | | |
|---|---|---|
| EP | 0 871 156 A2 | 10/1998 |
| EP | 1 048 423 A2 | 11/2000 |
| EP | 1 048 423 B9 | 5/2005 |
| EP | 1 671 562 A1 | 6/2006 |
| EP | 1 922 954 A1 | 5/2008 |
| EP | 1 922 954 B1 | 7/2009 |
| WO | WO 00/66856 A1 | 11/2000 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |

(56) References Cited

FOREIGN PATENT DOCUMENTS

| WO | WO 2011/151758 A3 | 12/2011 |
|----|-------------------|---------|
| WO | WO 2012/154113 A1 | 11/2012 |
| WO | WO 2013/025163 A1 | 2/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/108114 A1 | 7/2014 |
| WO | WO 2015/038059 A1 | 3/2015 |
| WO | WO 2015/105449 A1 | 7/2015 |

OTHER PUBLICATIONS

International Search Report mailed Apr. 16, 2015 in PCT/SE2014/051521, ISA/SE, Patent-och registreringsverket, Stockholm, SE, 4 pages.
Derelöv, Peter, et al., U.S. Appl. No. 14/794,883, entitled "Panel With a Slider," filed in the U.S. Patent and Trademark Office Jul. 9, 2015.
Boo, Christian, et al., U.S. Appl. No. 14/972,949, entitled "Panels Comprising a Mechanical Locking Device and an Assembled Product Comprising the Panels," filed in the U.S. Patent and Trademark Office Dec. 17, 2015.
U.S. Appl. No. 14/158,165, Derelöv, et al.
U.S. Appl. No. 14/486,681, Brännström, et al.
U.S. Appl. No. 14/573,572, Boo.
Derelöv, Peter, et al., U.S. Appl. No. 14/158,165, entitled "Assembled Product and a Method of Assembling the Product," filed in the U.S. Patent and Trademark Office Jan. 17, 2014.
Brännström, Hans, et al., U.S. Appl. No. 14/486,681, entitled "An Assembled Product and a Method of Assembling the Assembled Product," filed in the U.S. Patent and Trademark Office Sep. 15, 2014.
Boo, Christian, U.S. Appl. No. 14/573,572, entitled "A Furniture Panel," filed in the U.S. Patent and Trademark Office Dec. 17, 2014.
U.S. Appl. No. 15/171,403, Derelöv.
Derelöv, Peter, U.S. Appl. No. 15/171,403 entitled "Panel with a Slider", filed in the U.S. Patent and Trademark Office Jun. 2, 2016.
U.S. Appl. No. 15/415,356, Derelöv, et al.
U.S. Appl. No. 15/422,798, Fridlund.
U.S. Appl. No. 15/428,469, Fridlund.
U.S. Appl. No. 15/428,504, Boo.
U.S. Appl. No. 15/432,190, Fridlund.
Derelöv, Peter, et al., U.S. Appl. No. 15/415,356 entitled "Panels Comprising a Mechanical Locking Device and an Assembled Product Comprising the Panels", filed in the U.S. Patent and Trademark Office Jan. 25, 2017.
Fridlund, Magnus, U.S. Appl. No. 15/422,798 entitled "Set of Panels for an Assembled Product," filed in the U.S. Patent and Trademark Office Feb. 2, 2017.
Fridlund, Magnus, U.S. Appl. No. 15/428,469 entitled "Element and Method for Providing Dismantling Groove," filed in the U.S. Patent and Trademark Office Feb. 9, 2017.
Boo, Christian, U.S. Appl. No. 15/428,504 entitled "Set of Panel-Shaped Elements for a Composed Element," filed in the U.S. Patent and Trademark Office Feb. 9, 2017.
Fridlund, Magnus, U.S. Appl. No. 15/432,190 entitled "Method for Forming a Panel," filed in the U.S. Patent and Trademark Office Feb. 14, 2017.
U.S. Appl. No. 15/271,622, Derelöv, et al.
U.S. Appl. No. 15/308,872, Pervan.
U.S. Appl. No. 15/366,704, Derelöv.
U.S. Appl. No. 15/379,791, Håkansson, et al.
Derelöv, Peter, et al., U.S. Appl. No. 15/271,622 entitled "Panels Comprising Mechanical Locking Device and an Assembled Product Comprising the Panels", filed in the U.S. Patent and Trademark Office Sep. 21, 2016.
Pervan, Darko, U.S. Appl. No. 15/308,872 entitled "Mechanical Locking System for Building Panels," filed in the U.S. Patent and Trademark Office Nov. 4, 2016.
Derelöv, Peter, U.S. Appl. No. 15/366,704 entitled "Panels Comprising a Mechanical Locking Device and an Assembled Product comprising the Panels", filed in the U.S. Patent and Trademark Office Dec. 1, 2016.
Håkansson, Niclas, et al., U.S. Appl. No. 15/379,791 entitled "Mechanical Locking System for Building Panels," filed in the U.S. Patent and Trademark office Dec. 15, 2016.

PANELS COMPRISING A MECHANICAL LOCKING DEVICE AND AN ASSEMBLED PRODUCT COMPRISING THE PANELS

CROSS REFERENCE TO RELATED APPLICATIONS

The present application is a continuation-in-part of U.S. application Ser. No. 14/158,165, filed on Jan. 17, 2014, which claims the benefit of Swedish Application No. 1450022-7, filed on Jan. 10, 2014. The entire contents of each of U.S. application Ser. No. 14/158,165 and Swedish Application No. 1450022-7 are hereby incorporated herein by reference in their entirety.

TECHNICAL FIELD

The present disclosure relates to panels that may be arranged perpendicular to each other and locked together with a mechanical locking device. The panels may be assembled and locked together to obtain a furniture, such as a bookshelf, a cupboard, a wardrobe, a box, a drawer or a furniture component. The locking device may comprise a flexible tongue.

BACKGROUND

A furniture provided with a mechanical locking device is known in the art, as evidenced by WO2012154113(A1). The furniture comprises a first panel connected perpendicular to a second panel by a mechanical locking device comprising a flexible tongue in an insertion groove.

SUMMARY

One object of certain embodiments of the present disclosure is to provide an improvement over the above described technique and the known art. A specific objective is to improve the strength of a mechanical locking device at a corner of an assembled product, such as a furniture, a furniture component, a drawer, a cupboard, a bookshelf, a wardrobe, a kitchen fixture, or a box for storing or transporting.

A further object of embodiments of the present disclosure is to provide a furniture product with increased strength and stability.

At least some of these and other objects and advantages that will be apparent from the description have been achieved by a set of panels comprising a first panel having a first main plane and a second panel having a second main plane. The first panel and the second panel are provided with a mechanical locking device for locking a first edge of the first panel to a second edge of the second panel, wherein the first main plane is essentially perpendicular to the second main plane. Essentially perpendicular meaning that the first main plane is at an angle of 90°±10° of the second main plane. The first panel comprises a core comprising fibres arranged essentially parallel to the first main plane and the second panel comprises a core comprising fibres arranged essentially parallel to the second main plane. Essentially parallel meaning that the fibers are arranged at an angle of 0°±10° to the second main plane. The mechanical locking device comprises:

an edge section groove at the first edge, wherein an edge section of the second edge of the second panel is insertable into the edge section groove for locking the first panel and the second panel together in a first direction parallel to the first main plane; and a flexible tongue arranged in an insertion groove provided in the edge section groove of the first edge, wherein said flexible tongue cooperates with a tongue groove arranged at the edge section of the second edge of the second panel, for locking the first panel and the second panel in a second direction parallel to the second main plane.

A first thickness of a core material of the first panel between the edge section groove and the outermost surface of the first edge in a direction parallel to the first main plane is greater than a minimum second thickness of a core material of the edge section of the second edge of the second panel. Further, a first thickness of the first panel between the edge section groove and the outermost surface of the first edge in a direction parallel to the first main plane is greater than a minimum second thickness of the edge section of the second edge of the second panel.

The mechanical locking device may be subject to the greatest stress in the first direction parallel to the first main plane. The stress in the first direction may arise from a pressure load applied on the side panel at the top of a furniture, such as a bookshelf, a cupboard or a wardrobe. The minimum second thickness may be rather thin since the edge section of the second edge of the second panel has the fibre direction essentially perpendicular to the stress in the first direction. The first thickness is preferably greater than the minimum second distance because the fibre direction of the edge section groove of the first panel is essentially parallel to the stress in the first direction. The stress in the first direction may also arise before the first panel and the second panel are assembled and locked together, for example, during transport, production or during an assembling and locking of the first panel and the second panel.

The first thickness ranges from between 1.1 and 3.0 times larger than the minimum second thickness, and may be at least about 1.25 times larger; preferably about 1.5 time larger; and more preferably about 2.0 times larger than the minimum second thickness.

The first direction is preferably perpendicular to the first edge of the first panel and second direction is preferably perpendicular to the second edge of the second panel.

The flexible tongue may alternatively be arranged in an insertion groove in the edge section of the second edge of the second panel, and the tongue groove may be arranged in edge section groove of the first edge of the first panel. However, a greater size of the insertion groove, as compared to the tongue groove, may be required. Therefore, the alternative with the insertion groove in the edge section groove of the first panel may be the preferred alternative.

The edge section groove may comprise a first wall and an opposed second wall, wherein the first wall is closer to the outermost surface of the first edge than the second wall, wherein the first thickness is measured between the first wall and the outermost surface of the first edge.

The insertion groove may extend along essentially the entire length of the edge section groove of the first edge.

The tongue groove may extend along essentially the entire length of the edge section of second panel.

The edge section of the second panel may also comprise two or more insertion grooves and/or flexible tongues. The edge section of the first edge may comprise two or more tongue grooves.

The edge section groove may extend along essentially the whole first edge, and is preferably covered by a decorative layer, such as a plastic foil or a veneer, at a front edge of the first panel and may also be covered by a decorative layer, such as a plastic foil or a veneer at a back edge of the first panel. A length of the edge section of the second edge (measured along the second edge) preferably matches a length of the edge section groove (measured along the first edge). The second panel may be provided with at least one dismantling groove at an inner or outer face of the second panel. The embodiment of the first panel that is provided with the edge section groove that is covered at the back and the front edge is preferably connected to the embodiment of the second panel that is provided with at least one dismantling groove at the inner or outer face of the second panel. The dismantling groove is preferably adapted for insertion of a dismantling tool. The dismantling tool may be inserted into the dismantling groove to un-lock the mechanical locking device. The tongue groove at the edge section of the second edge of the second panel may be open at a back edge of the second panel. A dismantling tool may be inserted into the tongue groove provided that the edge section groove and the tongue groove are open at the back of the first and the second panel.

The flexible tongue may be displaceable in the insertion groove.

The edge section of the second panel may be provided with a calibrating groove.

The first panel or the second panel may be provided with a dismantling groove or recess, wherein dismantling groove or recess is preferably adapted for insertion of a dismantling tool.

The edge section of the second panel may comprise a first wall and an opposite second wall, wherein the tongue groove may be provided in the first wall, and the minimum second thickness may be measured between a bottom of the tongue groove and the second wall.

The flexible tongue may have a first displacement surface and an opposite second displacement surface which are configured to be displaced along a third displacement surface and a fourth displacement surface, respectively, of the insertion groove.

The core material of the first panel and the second panel may comprise a wood fibre based board, such as a HDF, MDF, plywood, solid wood or particleboard, a reinforced plastic board or a wood fibre composite board.

The first panel and the second panel are preferably provided with a decorative layer.

The outermost surface of the first edge of the first panel may be essentially in the same plane as, for example, flush with, an outer face of the second panel.

A second aspect of the present disclosure is an assembled product, such as a furniture, comprising the set of panels described above. The assembled product is preferably configured to be assembled without tools.

BRIEF DESCRIPTION OF THE DRAWINGS

Embodiments of the present disclosure will by way of example be described in more detail with reference to the appended schematic drawings, in which.

DETAILED DESCRIPTION

Figure 1A:
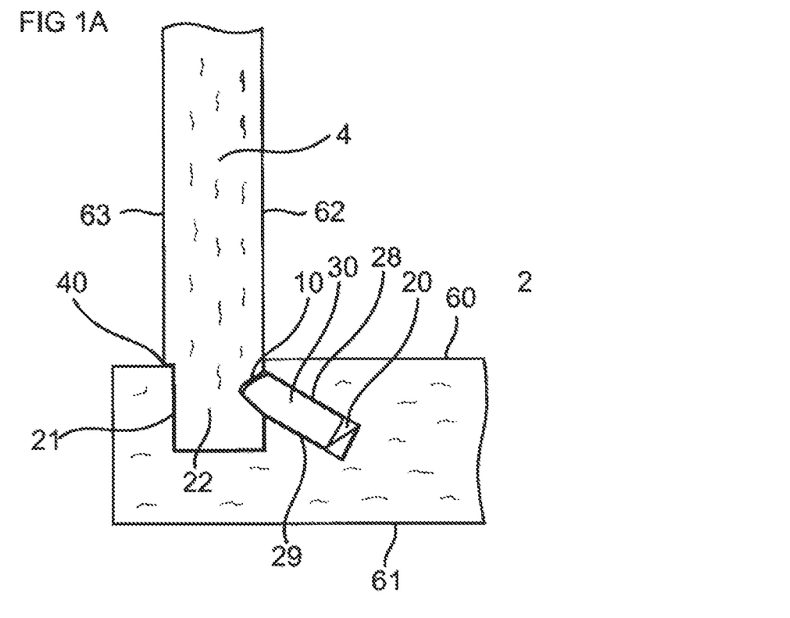
FIGS. 1A-1B show panels provided with a mechanical locking system according to an embodiment of the present disclosure.
Figure 1B:
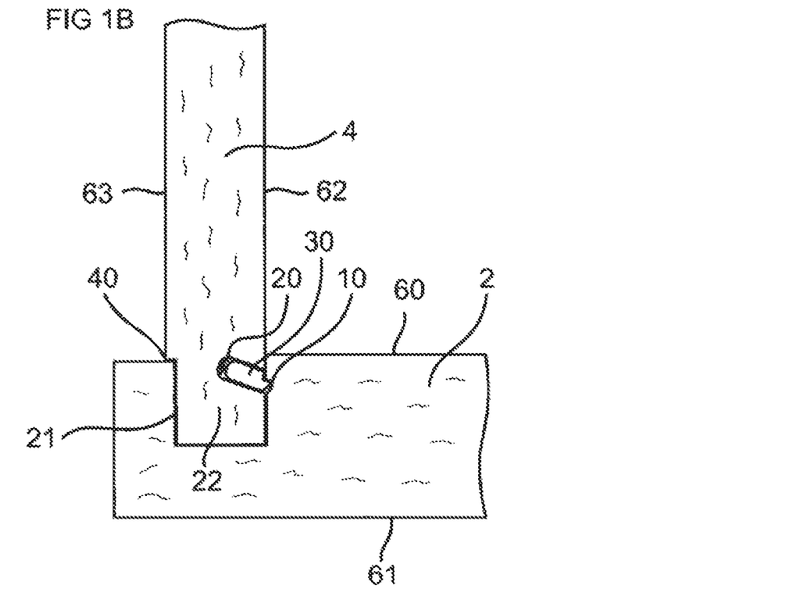

FIGS. 1A-B show two panels 2, 4 that are arranged perpendicular to each other and locked together. The two panels may be a part of a furniture or a furniture component, such as a bookshelf, a cupboard, a wardrobe, a box, a drawer or a furniture component. The two panels may be a first panel 2 having a first main plane and a second panel 4 having a second main plane. The first panel 2 and the second panel 4 are provided with a mechanical locking device for locking a first edge of the first panel 2 to a second edge of the second panel 4, wherein the first main plane is essentially perpendicular to the second main plane. The first panel 2 comprises a core comprising fibres arranged essentially parallel to the first main plane, and the second panel 4 comprises a core comprising fibres arranged essentially parallel to the second main plane. The mechanical locking device comprises an edge section groove 21 at the first edge, and an edge section 22 at the second edge of the second panel 4. The edge section 22 is inserted into the edge section groove 21 for locking the first panel 2 and the second panel 4 in a direction parallel to the first main plane. The mechanical locking device further comprises a flexible tongue 30 arranged in an insertion groove 20 preferably provided in the edge section groove 21 as shown in FIG. 1A. The flexible tongue 30 cooperates with a tongue groove 10, preferably provided at the edge section 22 as shown in FIG. 1A, for locking the first panel 2 and the second panel 4 in a direction parallel to the second main plane. The edge section groove 21 and the tongue groove 10 are preferably formed by mechanically cutting, such as milling, of the first panel 2 and the second panel 4, respectively. The first panel comprises an inner face 60 and an outer face 61 that are preferably essentially parallel to the first main plane. The second panel 4 comprises inner face 62 and an outer face 63 that are preferably essentially parallel to the second main plane. The inner face 60 of the first panel 2 and the inner face 62 of the second panel are preferably configured to face toward an inside of an assembled product. The edge section 22 of the second panel 4 may be provided with a calibrating groove 40, which reduces the thickness of the edge section 22, at the inner face 62 and/or the outer face 63 of the second panel 4. The calibrating groove 40 is preferably formed by mechanically cutting, such as milling, of the second panel 4.

FIG. 1B shows that the flexible tongue 30 may alternatively be arranged in an insertion groove 20 in the edge section 22 of the second panel 4 and the tongue groove 10 may be arranged in edge section groove 21 of the first edge of the first panel 2. However, a greater size of the insertion groove 20, as compared to the tongue groove 10, may be required. Therefore, the embodiment in FIG. 1A with the insertion groove 20 in the edge section groove 21 may be the preferred embodiment.

Figure 2A:
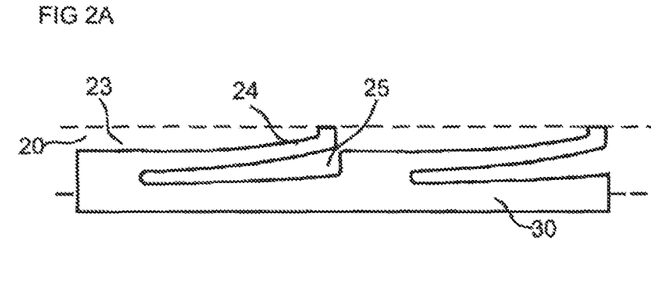
FIGS. 2A-2F show a flexible tongue according to an embodiment of the present disclosure.
Figure 2B:
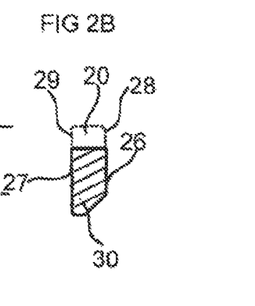
Figure 2C:
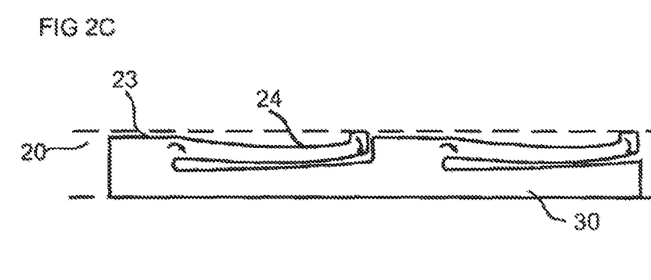
Figure 2D:
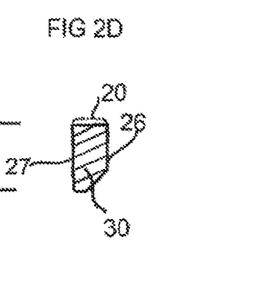

An embodiment of the flexible tongue 30, which is displaceable in an insertion groove 20, is shown in FIGS. 2A-2D. FIGS. 2A-2B show the flexible tongue 30 in a locked portion and FIGS. 2C-2D show the flexible tongue 30 during assembling of the first panel 2 and the second panel 4. FIG. 2B shows a cross section of the flexible tongue 30 in FIG. 2A. FIG. 2D shows a cross section of the flexile tongue 30 in FIG. 2C. The flexible tongue 30 comprises bendable protruding parts 24. A space 23 is provided between the flexible tongue 30 and a bottom wall of the insertion groove 20. FIG. 2C shows that the flexible tongue 30 is pushed into the insertion groove 20 and towards the bottom wall of the insertion groove 20 during assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement surface 29, respectively, of the insertion groove 20.

Figure 2E:
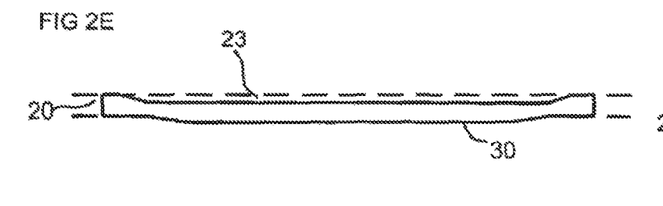
Figure 2F:
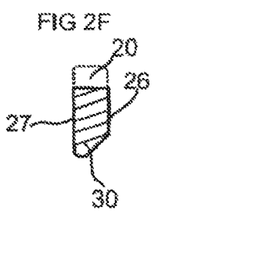

An alternative embodiment of the flexible tongue 30, without the protruding bendable parts 24, is shown in FIGS. 2E-2F. FIG. 2F shows a cross section of the flexible tongue 30 shown in FIG. 2E. The alternative embodiment is bendable in its length direction in order to accomplish the same function as the embodiment shown in FIGS. 2A-2D.

Figure 3A:
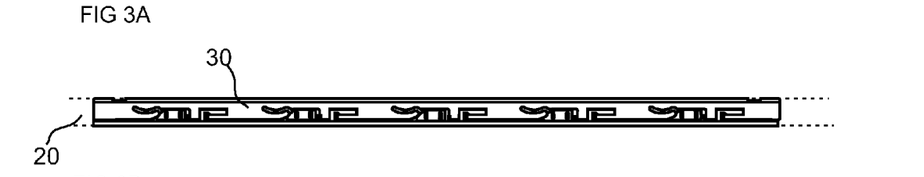
FIGS. 3A-3B show a flexible tongue according to an embodiment of the present disclosure.
Figure 3B:
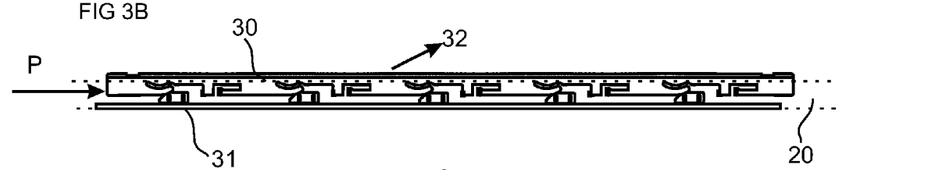

A further embodiment of the flexible tongue 30 is shown in FIGS. 3A-3B. FIG. 3A shows the flexible tongue 30 before the first panel 2 and the second panel 4 are locked in the direction parallel to the second main plane. The flexible tongue 30 comprises an inner part 31 provided with wedge elements and outer part for the locking of the first panel 2 and the second panel 4 in the direction parallel to the second main plane. The locking is obtained by applying a force P, in a direction parallel to the first edge of the first panel 2, at a short edge of the outer part. The force P displaces the outer part of the flexible tongue 30 in the direction parallel to the first edge of the first panel 2 and the wedge elements force the outer part of the flexible tongue 30 in a perpendicular direction, out of the insertion groove 20. The resulting displacement, shown with arrow 32, of the outer part of the flexible tongue 30 is therefore in a direction between the direction parallel to the first edge of the first panel 2 and the perpendicular direction. Each of the panels 2-6 may include a flexible tongue 30.

Figure 4A:
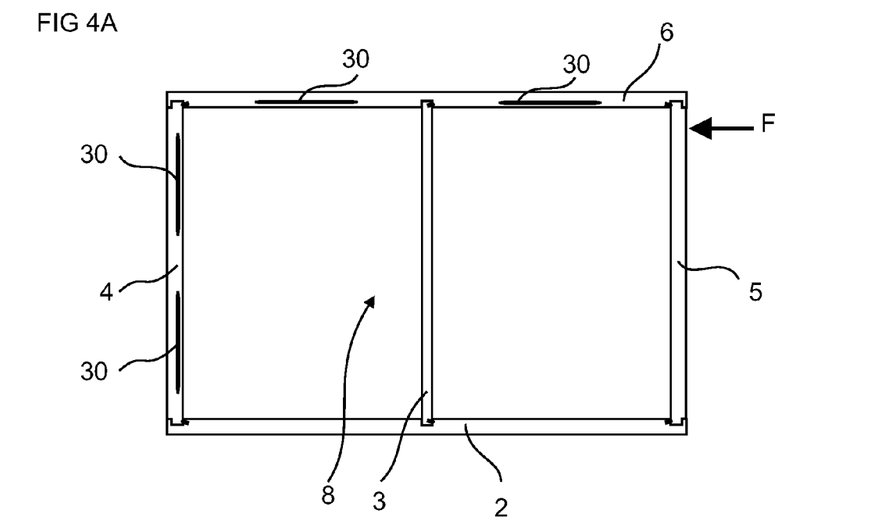
FIGS. 4A-4B show embodiments of an assembled product

FIG. 4A shows an assembled product, such as furniture, with a frame that comprises a first set of the first panel 2 and the second panel 4 locked to a second set of the first panel 6 and the second panel 5. A first edge of the second panel 4, 5 may be essentially identical to the second edge of the second panel 4, 5 and a second edge of the first panel 2, 6 may be essential identical to the first edge of the first panel 2, 6 to enable locking the first set and the second set together as shown in FIG. 4A. The first panel 2 of the first set is arranged opposite to the first panel 6 of the second set. The second panel 4 of the first set is arranged opposite the second panel 5 of the second set. A third panel 3 configured essentially as the second panel and provided with the flexible tongue 30 at an edge section of the third panel, may be locked to the first panel 2 of the first set and the first panel 6 of the second set.

Figure 4B:
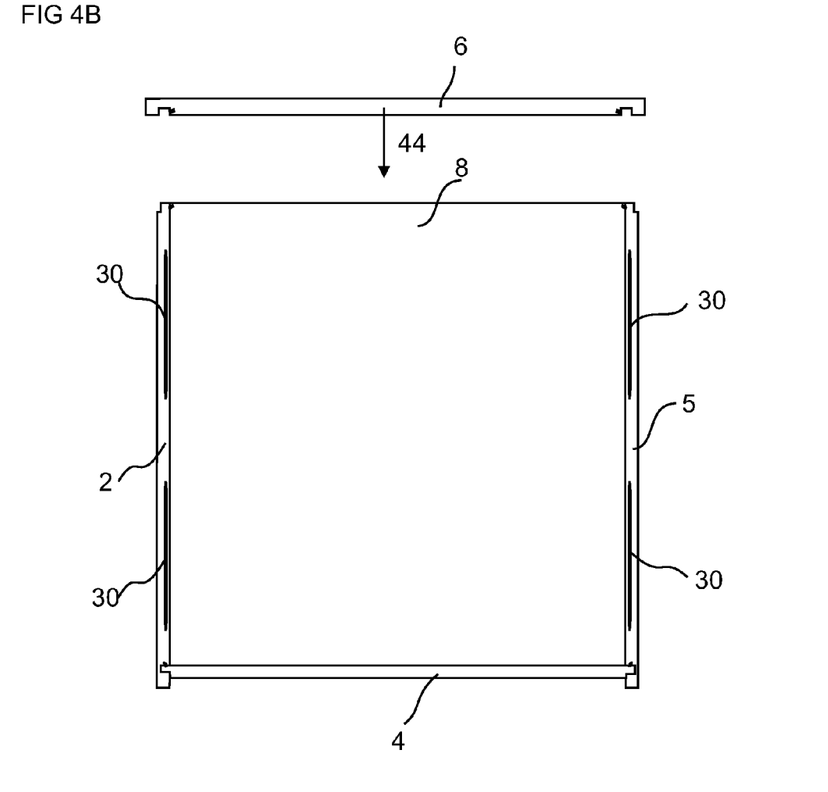

FIG. 4B shows an alternative embodiment of the frame with an alternative configuration of the first edge of the second panel 6 of the second set and the second edge of the first panel 2 of the first set. FIG. 4B shows that assembly involves, using the first panel 6 of the second set as an example, simply displacing the first panel in the direction of arrow 44 such that no further steps or tools may be necessary to lock the first panel 6 of the second set with other panels of the product. See also, Swedish patent application SE 1351060-7, which is expressly incorporated herein by reference in its entirety.

All edges of the panels 2-6 of the assembled product may be locked together with a mechanical device comprising the flexible tongue 30. The assembling may be completed without the use of tools and/or binding agents such as glue.

A fourth panel 8, such as a back panel or a bottom panel, may be arranged in a third main plane, which is essentially perpendicular to the first main plane and the second main plane. A first edge and a second edge of the fourth panel 8 may be locked by a mechanical locking device at a first back or bottom edge and a second back or bottom edge, respectively, of the frame. A third edge and a fourth edge of the fourth panel 8 are preferably inserted into a groove provided at a third back or bottom edge and a fourth back or bottom edge, respectively, of the frame. The frame may be subject so a force F during transportation, production or assembling of the assembled product. Locking of the fourth panel 8 to the frame by the mechanical locking device improves the strength and the stability of the assembled product. The fourth panel may comprise two or more elements 8a, 8b which are preferably locked together by a mechanical locking system. An embodiment of the mechanical locking system is shown in FIG. 3C, discussed below.

The first panel 6 of the second set may be locked to the other panels of the frame at a later occasion and/or at another location. The first panel 6 of the second set may be locked to the other panels of the frame and the bottom or back panel by simple displacement 44 as discussed above, and no further steps or tools may be necessary.

Figure 3C:
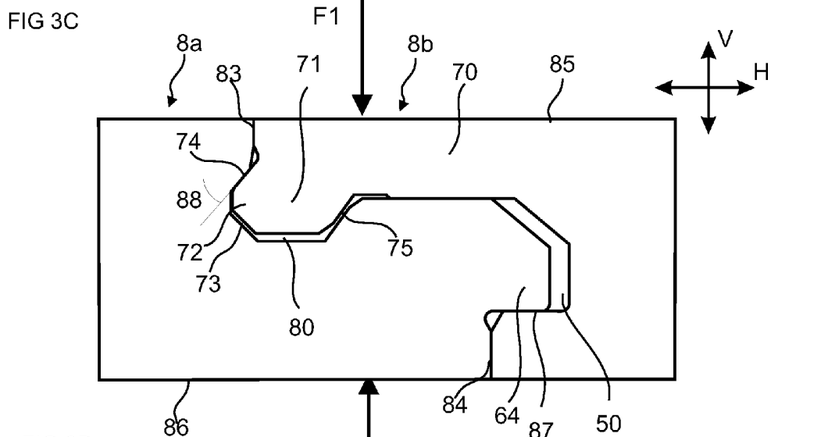
FIGS. 3C-3D show a mechanical locking system for a backside or bottom panel according to an embodiment of the present disclosure.
Figure 3D:
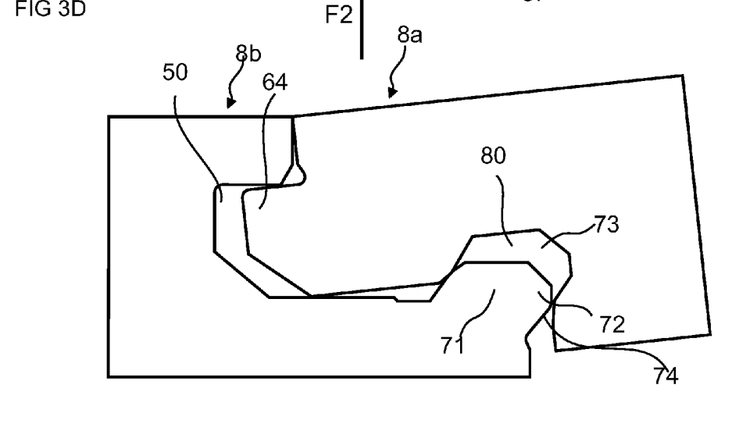

FIG. 3C shows an embodiment of a furniture panel 8, such as a back or bottom panel, comprising a first element 8a and a second element 8b provided with a mechanical locking system configured to lock the first 8a element and the second element 8b together.

The first main plane of the first element 8a is essentially parallel to a second main plane of the second element 8b, wherein the furniture panel comprises a first face 85 and an opposite second face 86 which are parallel to a main plane of the furniture panel 8. The mechanical locking system may include:

- a first tongue 64 provided at a first edge of the first element 8a, wherein the first tongue 64 is configured to cooperate with a first tongue groove 50 provided at a second edge of the second element 8b for locking together the first element 8a and the second element 8b in a vertical direction V;
- a second tongue 72 at the second edge of the second element 8b, wherein the second tongue 72 is configured to cooperate with a second tongue groove 73 at the first edge of the first element 8a for locking together the first element 8a and the second element 8b in the vertical direction V;
- a first pair of locking surfaces 83 provided above the second tongue 72 and the second tongue groove 73 for locking together the first element 8a and the second element 8b in a horizontal direction H; and second pair of locking surfaces 84 provided below the first tongue 64 and the first tongue groove 50 for locking together the first element 8a and the second element 8b in the horizontal direction H.

The first pair of locking surfaces 83 is preferably essentially vertical. The second pair of locking surfaces 84 is also preferably essentially vertical.

The first tongue 64 and the first tongue groove 50 cooperate at a third pair of locking surfaces 87 that is preferably arranged essentially horizontally.

The second tongue 72 and the second tongue groove 73 cooperate at a fourth pair of locking surfaces 74 that is preferably arranged at an angle 88 to the main plane of the furniture panel 8 that is greater than zero. The angle 88 has a range that allows the first element 8a to be locked to the second element 8b by an angling motion of the first element 8a relative to the second element 8b or of the second element 8b relative to the first element 8a, wherein the first tongue 64 is inserted in the first tongue groove 50.

The first face 85 of the first element 8a and the second element 8b is arranged upwards in the vertical direction, e.g., in the direction were the greatest load F1 is likely to be exerted on the furniture panel 8, to prevent the first element 8a and the second element 8b from being unlocked by a reversed angling motion. A second face 86 is arranged downwards in the vertical direction, e.g., in the direction where the smallest load F2 is likely to be applied on the furniture panel 8.

Figure 5:
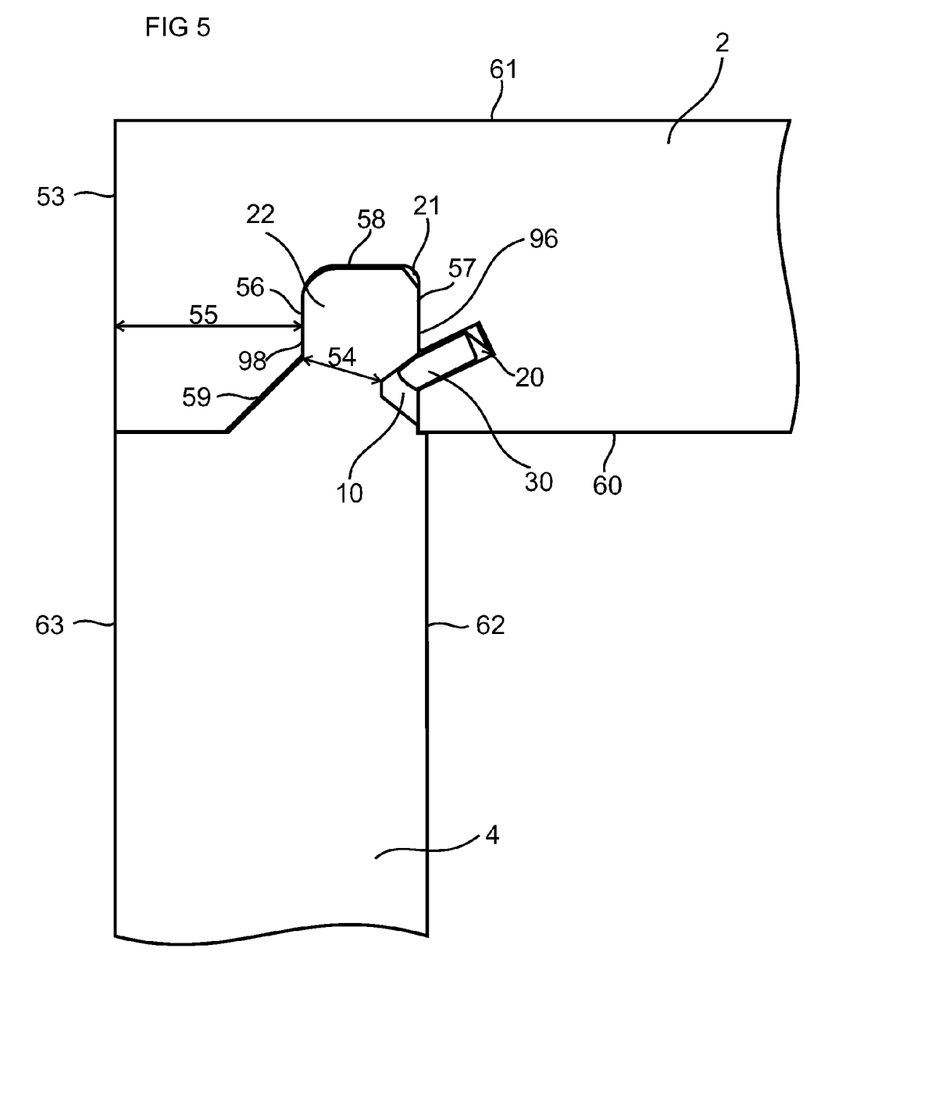
FIG. 5 shows panels provided with a mechanical locking system according to an embodiment of the present disclosure.

The second element 8b may include a strip 70 extending from first tongue groove 50 and including a protruding element 71 and the. The strip 70 may include a recess adjacent the protruding element 71. The protruding element 71 essentially matches a third groove 80 provided at the first edge of the first element 8a. The protruding element 71 may protrude upwards in the vertical direction V and the groove 80 may be open downwards in the vertical direction V. A third space 75, that extends in the horizontal direction H, may be provided between the protruding element 73 and the third groove 80. The third space 75 may facilitate the locking by an angling motion. FIG. 5 shows an embodiment that comprises a first thickness 55 of a core material of the first panel 2, between the edge section groove 21 and the outermost surface of the first edge in a direction parallel to the first main plane. The first thickness 55 is greater than a minimum second thickness 54 of a core material of the edge section 22 of the second panel 4. The first thickness 55 ranges from between 1.1 and 3.0 times larger than the minimum second thickness 54, and may be at least about 1.25 times larger; preferably about 1.5 times larger; and more preferably about 2.0 times larger than the minimum second thickness. In an embodiment, the edge section groove 21 comprises a first wall 56 and an opposed second wall 57, wherein the first wall 56 is closer to the outermost surface 53 of the first edge than the second wall 57. The first thickness 55 is preferably measured between the first wall 56 and the outermost surface 53 of the first edge. The first wall 56 and the second wall 57 are preferably connected by a bottom wall 58.

The edge section 22 of the second panel 4 may comprise a first wall 96 and an opposite second wall 98, wherein the tongue groove 10 is provided in the first wall 96. The minimum second thickness 54 may be measured between a bottom of the tongue groove 10 and the second wall 98.

In the embodiment, having the insertion groove 20 extend along essentially the entire length of the edge section groove 21 of first edge of the first panel may lead to an easier production of the first panel 2. Having the tongue groove 10 extend along essentially the entire length of the edge section 22 of the second panel 4 may also lead to an easier production of the second panel 4.

The outermost surface 53 of the first panel 2 is in a preferred embodiment essentially in the same plane as, for example, flush with, the outer face 63 of the of the second panel 4.

An edge of the opening of the edge section groove 21 may be provided with a bevel 59 or rounding in order to facilitate the insertion of the flexible tongue 30 into the insertion groove 20.

Figure 6A:
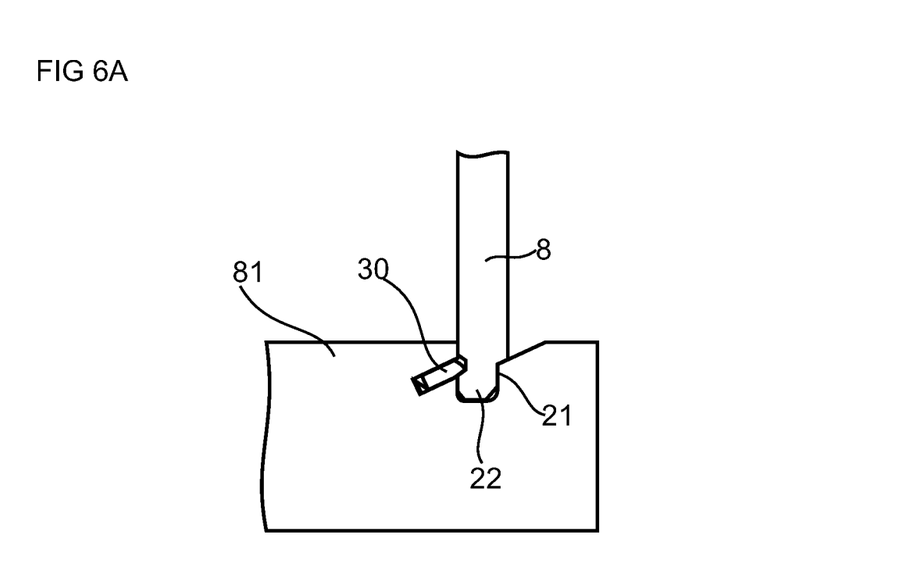
FIGS. 6A-6B show panels provided with a mechanical locking system according to an embodiment of the present disclosure.

FIG. 6A shows an embodiment of a mechanical locking device for locking the fourth panel 8 to any first or second back or bottom edge 81 of a frame. An embodiment of the frame is shown in FIGS. 4A-4B. The mechanical locking device may be essentially identical to the mechanical locking device described above.

Figure 6B:
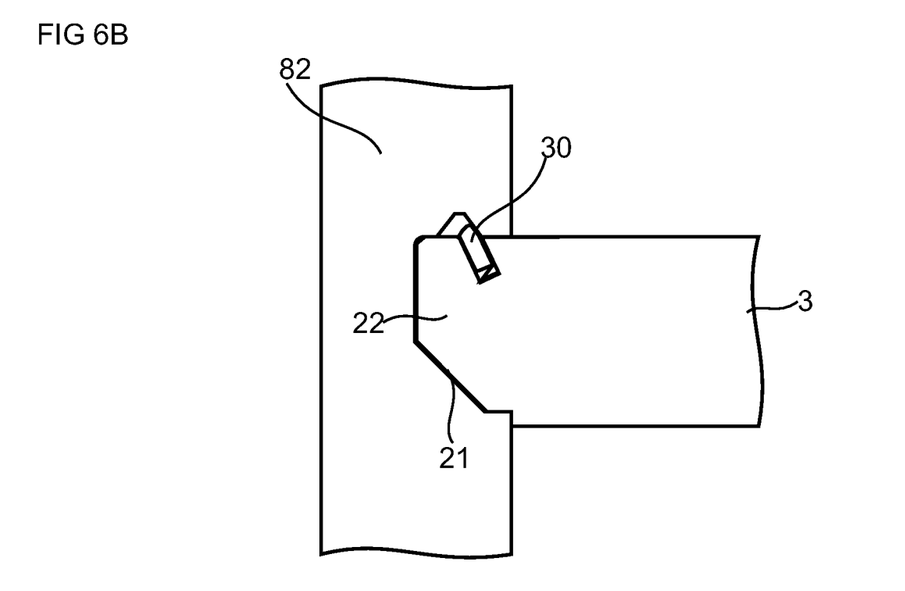

FIG. 6B shows an embodiment of a mechanical locking device for locking the third panel 3 to any first or second panel 82 of a frame. An embodiment of the frame is shown in FIGS. 4A-4B. The mechanical locking device may be essentially identical to the locking device described above.

Figure 7A:
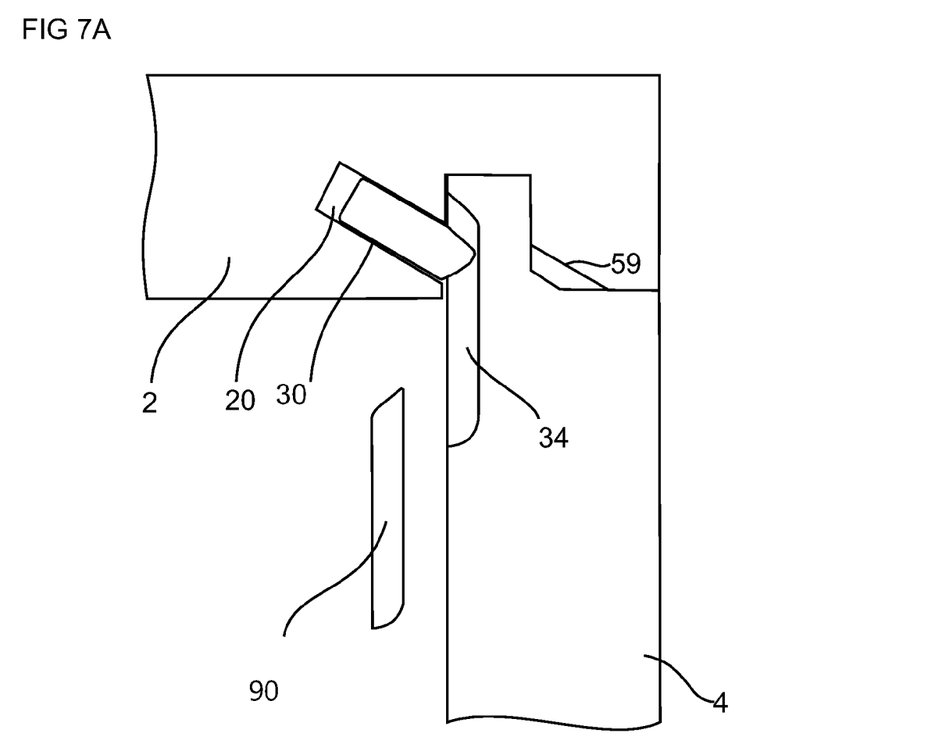
FIGS. 7A-7B show panels and a disassembling tool and groove according to an embodiment of the present disclosure.
Figure 7B:
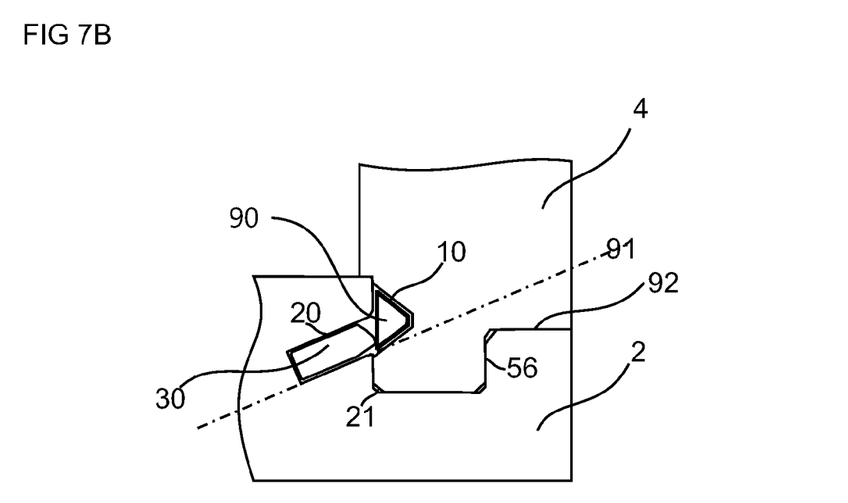

FIGS. 7A-7B show an embodiment of a dismantling groove or recess 34 that is provided at the inner face 62 of the second panel 4. Said dismantling groove or recess 34 is preferably adapted for insertion of a dismantling tool 90. The mechanical locking system may be unlocked by insertion of the dismantling tool 90 into dismantling groove. The insertion tool 90 is preferably configured to push the flexible tongue 30 further into the insertion groove 20 in order to unlock the mechanical locking system.

FIG. 7B shows that a dismantling tool 90 may be inserted into the tongue groove 10 provided that the edge section groove 21 and the tongue groove 10 are open at the back and/or front of the first panel 2 and the second panel 4.

The insertion of the flexible tongue 30 into the insertion groove 20 may be facilitated if a top surface 92 of the first edge section of the first panel 2 at the first wall 56 of the edge section groove 21 is lowered. A lowered top surface 92 increases the distance between a plane 91 extending in a direction of a lower surface of the insertion groove 20 and the top surface 92. This increased distance may provide more space for a tongue insertion machine.

The core material of the panels and elements in the embodiments above preferably comprises a wood fibre based board, such as a HDF, MDF, plywood, solid wood or particleboard, a reinforced plastic board, or a wood fibre composite board.

When the word "about" is used in this specification in connection with a numerical value, it is intended that the associated numerical value include a tolerance of +/−10% around the stated numerical value.

The invention claimed is:

1. A set of panels comprising a first panel having a first main plane and a second panel having a second main plane, wherein the first panel and the second panel are provided with a mechanical locking device for locking a first edge of the first panel to a second edge of the second panel, wherein the first main plane is essentially perpendicular to the second main plane, wherein the first panel comprises a core comprising fibres arranged essentially parallel to the first main plane and the second panel comprises a core comprising fibres arranged essentially parallel to the second main plane, and the mechanical locking device comprises:

an edge section groove at the first edge of the first panel, wherein an edge section of the second edge of the second panel is insertable into the edge section groove for locking the first panel and the second panel together in a direction parallel to the first main plane; and a flexible tongue arranged in an insertion groove provided in the edge section groove, wherein said flexible tongue cooperates with a tongue groove provided at the edge section of the second panel, for locking the first panel and the second panel in a direction parallel to the second main plane, wherein a first thickness, measured in a direction parallel to the first main plane, of a core material of the first panel between the edge section groove and an outermost surface of the first edge, which outermost surface extends in a direction essentially perpendicular to the first main plane, is greater than a minimum second thickness of a core material from one side of the edge section of the second panel to an opposite side of the edge section of the second panel, wherein the outermost surface of the first edge of the first panel is essentially flush with an outer face of the second panel, wherein the edge section groove comprises a first wall and an opposed second wall that extend essentially perpendicular to the first main plane, and a bottom wall between the first wall and the opposed second wall, and the insertion groove is located in one of the first wall and the opposed second wall.

2. The set of panels as claimed in claim 1, wherein the first thickness is between 1.1 and 3.0 times larger than the minimum second thickness.

3. The set of panels as claimed in claim 2, wherein the first thickness is about 1.25 times larger than the minimum second thickness.

4. The set of panels as claimed in claim 1, wherein the edge section groove comprises a first wall and an opposed second wall, wherein the first wall is closer to the outermost surface of the first edge than the second wall, the first thickness is measured between the first wall and the outermost surface of the first edge.

5. The set of panels as claimed in claim 1, wherein the insertion groove extends along essentially the entire length of the edge section groove of the first edge.

6. The set of panels as claimed in claim 1, wherein the tongue groove extends along essentially the entire length of the edge section of the second panel.

7. The set of panels as claimed in claim 1, wherein the flexible tongue is displaceable in the insertion groove during locking of the first panel with the second panel.

8. The set of panels as claimed in claim 1, wherein the edge section of the second panel is provided with a calibrating groove.

9. The set of panels as claimed in claim 1, wherein the first panel or the tongue groove of the second panel is provided with a dismantling recess, said dismantling recess being adapted for insertion of a dismantling tool.

10. The set of panels as claimed in claim 1, wherein the edge section of the second panel comprises a first wall and an opposite second wall, wherein the tongue groove is provided in the first wall, and the minimum second thickness is measured between a bottom of the tongue groove and the second wall.

11. The set of panels as claimed in claim 1, wherein the flexible tongue has a first displacement surface and a opposite second displacement surface which are configured to be displaced along a third displacement surface and a fourth displacement surface, respectively, of the insertion groove.

12. The set of panels as claimed in claim 1, wherein the core material of the first panel and the second panel comprises a wood fibre based board, that is at least one of HDF, MDF, plywood, solid wood or particleboard, a reinforced plastic board and a wood fibre composite board.

13. An assembled product comprising panels of the set of panels as claimed in claim 1 that are locked together to form the assembled product.

\* \* \* \* \*